United States Patent [19]

Kimura et al.

[11] Patent Number: 5,197,136
[45] Date of Patent: Mar. 23, 1993

[54] PROCESSING SYSTEM FOR BRANCH INSTRUCTION

[75] Inventors: Kozo Kimura; Tokuzo Kiyohara; Toshimichi Matsuzaki, all of Osaka, Japan

[73] Assignee: Matsushita Electric Industrial Co., Ltd., Osaka, Japan

[21] Appl. No.: 614,680

[22] Filed: Nov. 19, 1990

Related U.S. Application Data

[63] Continuation of Ser. No. 269,171, Nov. 9, 1988, abandoned.

[30] Foreign Application Priority Data

Nov. 12, 1987 [JP] Japan .................................. 62-286065
Nov. 12, 1987 [JP] Japan .................................. 62-286066

[51] Int. Cl.$^5$ ................................................ G06F 9/40
[52] U.S. Cl. ................................. 395/375; 364/261.7; 364/938
[58] Field of Search ........................................ 395/375

[56] References Cited

U.S. PATENT DOCUMENTS

| | | |
|---|---|---|
| 3,490,005 | 1/1970 | Anderson et al. |
| 3,551,895 | 12/1970 | Driscoll ............................... 364/200 |
| 3,764,988 | 10/1973 | Onishi ................................. 364/200 |
| 4,399,507 | 8/1983 | Cosgrove et al. ................... 364/200 |
| 4,435,756 | 3/1984 | Potash ................................. 364/200 |
| 4,471,433 | 9/1984 | Matsumoto et al. ................ 364/200 |
| 4,777,594 | 10/1988 | Jones et al. ......................... 364/200 |
| 4,853,840 | 8/1989 | Shibuya .............................. 364/200 |

OTHER PUBLICATIONS

G. F. Grohoski et al., "A Performance Model for Instruction Prefetch in Pipelined Instruction Units", Proceeding of the 1982 International Conference on Parallel Processing, Aug. 24, 1982, pp. 248-252.

M. V. Wilkes "Keeping Jump Instructions Out of the Pipeline of a Risc-Like Computer", Computer Architecture News, vol. 11, No. 5, 1983, pp. 5-7.

Ivan Flores, "Lookahead Control in the IBM System 370 Model 165", Computer, vol. 7, No. 11, Nov. 1974, pp. 24-38.

*Primary Examiner*—David Y. Eng
*Attorney, Agent, or Firm*—Lowe, Price, LeBlanc & Becker

[57] ABSTRACT

A storage holds instructions including a branch instruction and a corresponding branch destination instruction. The instructions are sequentially fetched from the storage to a decoder. The decoder sequentially decodes the fetched instructions and derives commands from the respective instructions. The commands are sequentially transferred from the decoder to an execution unit. The execution unit sequentially executes the transferred commands. The decoder serves to detect the branch instruction. When the branch instruction is detected, a normal instruction fetching process is interrupted and the branch destination instruction is promptly fetched to the decoder. The decoder prevents a command of the branch instruction from being transferred to the execution unit.

4 Claims, 8 Drawing Sheets

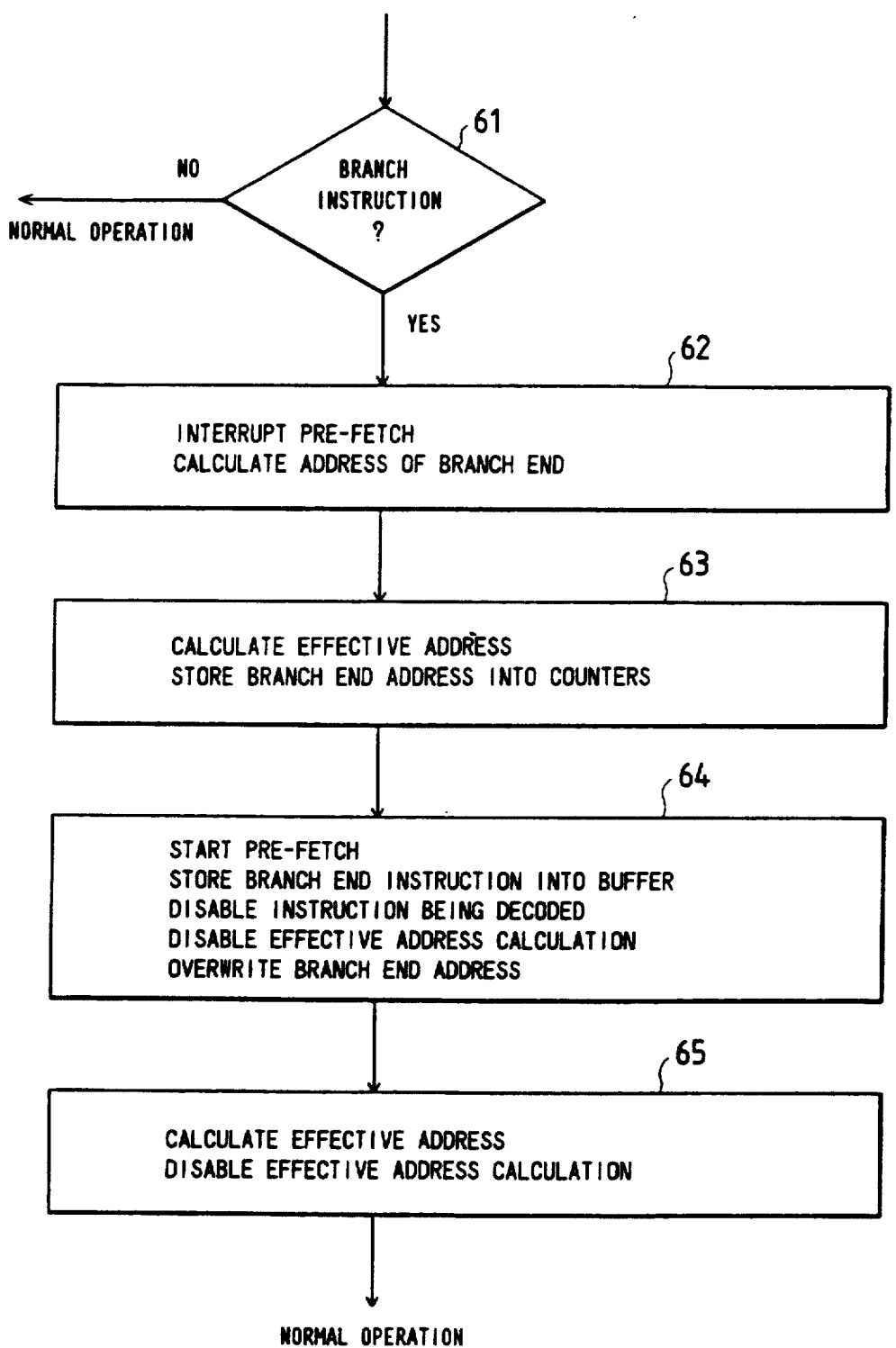

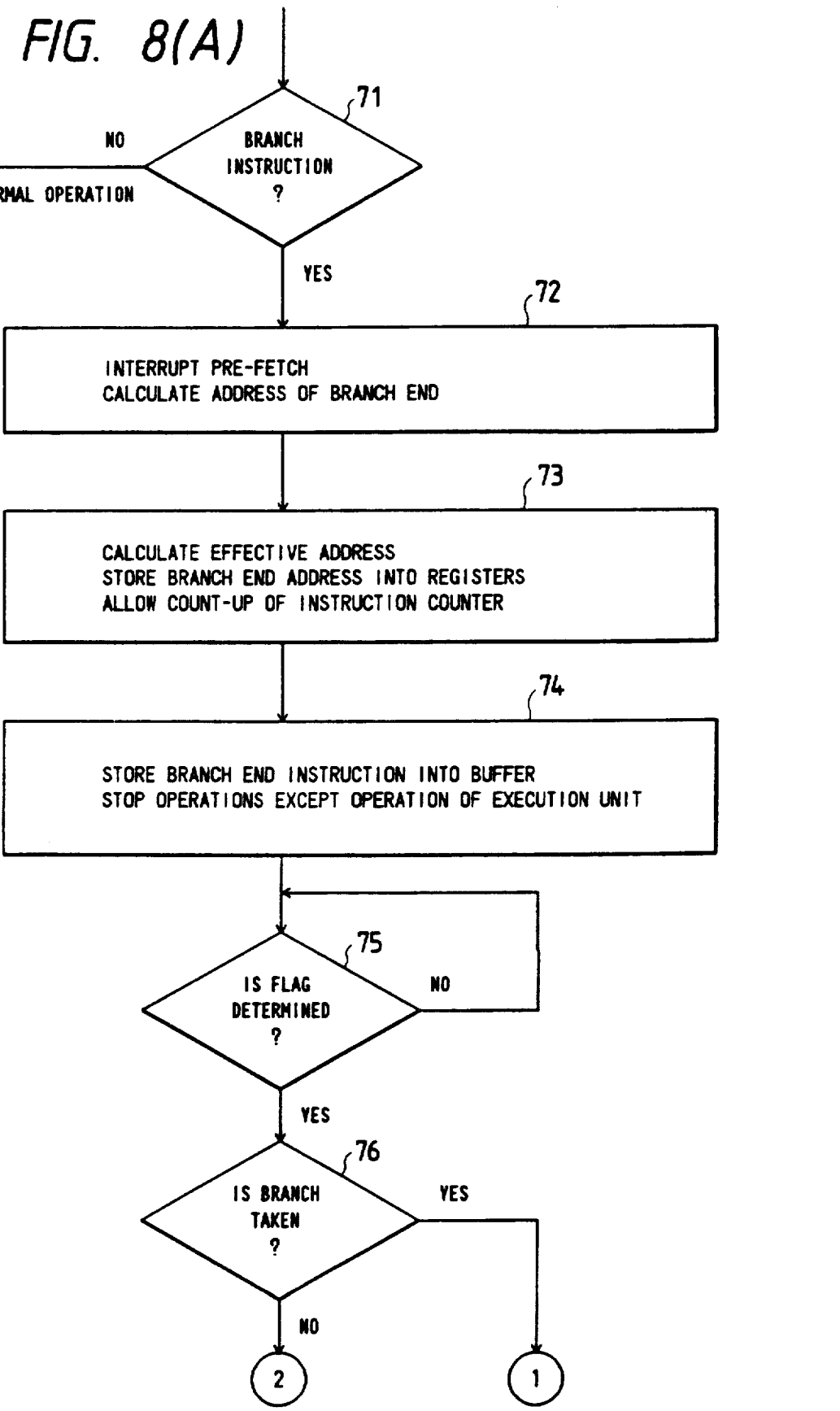

PROCESSING SYSTEM FOR BRANCH INSTRUCTION

This application is a continuation of application Ser. No. 07/269,171 filed Nov. 9, 1988, now abandoned.

BACKGROUND OF THE INVENTION

This invention relates to a processing system for a branch instruction in data processing.

Conventional data processing systems have a problem in respect of the speed of execution of a branch instruction. A main cause of this problem is that the branch instruction enters an execution unit and is processed by the execution unit.

SUMMARY OF THE INVENTION

It is an object of this invention to provide a high-speed processing system for a branch instruction.

In a processing system of this invention, a storage holds instructions including a branch instruction and a corresponding branch destination instruction. The instructions are sequentially fetched from the storage to a decoder. The decoder sequentially decodes the fetched instructions and derives commands from the respective instructions. The commands are sequentially transferred from the decoder to an execution unit. The execution unit sequentially executes the transferred commands. The decoder serves to detect the branch instruction. When the branch instruction is detected, a normal instruction fetching process is interrupted and the branch destination instruction is promptly fetched to the decoder. The decoder prevents a command of the branch instruction from being transferred to the execution unit.

BRIEF DESCRIPTION OF THE DRAWINGS

FIG. 7 is a flowchart of operation of the instruction decoder of FIGS. 1 and 6.

FIGS. 8A, 8B and 8C are flowcharts of operation of the instruction decoder of FIG. 3.

DESCRIPTION OF THE FIRST PREFERRED EMBODIMENT

Figure 1:
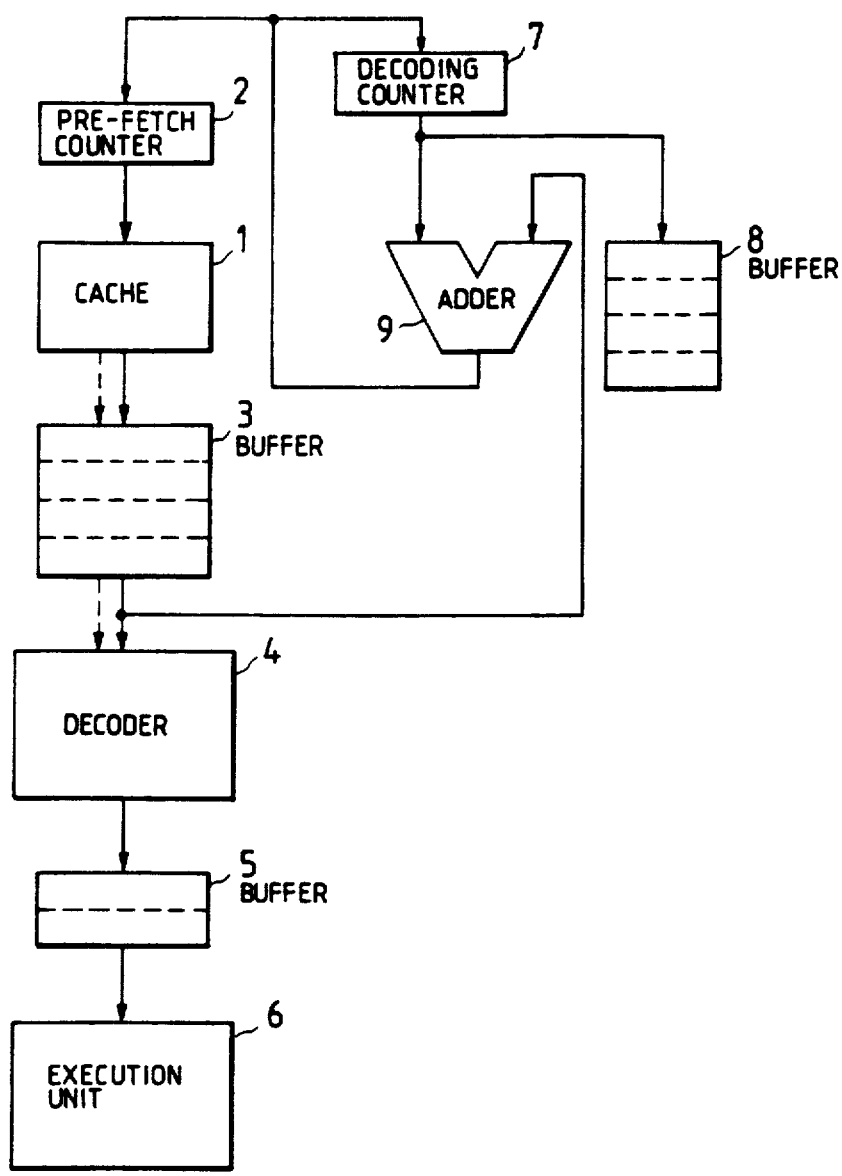
FIG. 1 is a block diagram of a processing system for a branch instruction according to a first embodiment of this invention.

With reference to FIG. 1, a processing system for a branch instruction includes a cache 1 holding instructions which can be read out at a high speed. In FIG. 1, an unconditional branch instruction flows along arrows composed of broken lines. An instruction pre-fetch counter 2 outputs an address to the cashe 1 to precedently fetch a corresponding instruction from the cache 1 to a FIFO (First-In First-Out) type instruction buffer 3. The instruction buffer 3 has four stages. It should be noted that the instruction buffer 3 may have only one stage or the number of stages of the instruction buffer 3 may differ from four. In general, the address outputted from the pre-fetch counter 2 is periodically updated so that instructions are sequentially transferred from the cache 1 to the instruction buffer 3. During the address updating process, the instruction pre-fetch counter 2 counts up the address by a value corresponding to the number of bytes of the related instruction. The instruction buffer 3 sequentially receives instructions from the cache 1 and cues the instructions. An instruction decoder 4 sequentially receives instructions from the instruction buffer 3 and decodes the instructions, thereby deriving commands from the decoded instructions. As will be made clear hereinafter, the instruction decoder 4 has several control functions. It should be noted that lines of transmission of control signals from the instruction decoder 4 to other elements are omitted from FIG. 1. A FIFO type execution command buffer 5 cues commands outputted from the instruction decoder 4. The execution command buffer 5 has two stages. It should be noted that the execution command buffer 5 may have only one stage or the number of stages of the execution command buffer 5 may differ from two. An execution unit 6 sequentially receives commands from the execution command buffer 5 and executes the commands. An instruction decoding counter 7 generates an address corresponding to an instruction to be subsequently proeecessed in the instruction decoder 4. The address generated by the instruction decoding counter 7 is periodically updated. During the address updating process, the instruction decoding counter 7 counts up the address by a value corresponding to the number of bytes of the related instruction. A FIFO type program counter buffer 8 cues addresses which are sequentially outputted from the instruction decoding counter 7. The program counter buffer 8 has four stages. It should be noted that the program counter buffer 8 may have only one stage or the number of stages of the program counter buffer 8 may differ from 4. In general, addresses stored in the program counter buffer 8 correspond to instructions which are being subjected to a decoding process, a process or information in a first stage of the execution command buffer 5, a process or information in a second stage of the execution command buffer 5, and an execution process respectively. An adder 9 is controlled by the instruction decoder 4 in response to a branch instruction. Specifically, the adder 9 adds an address outputted from the instruction decoding counter 7 and a displacement supplied from the instruction buffer 3, and thereby generates a new address corresponding to an instruction which is located at a downstream end or destination of a branch related to the branch instruction. The instruction which is located at the destination of the branch is called a branch destination instruction. The execution of commands by the execution unit 6 should jump from the branch instruction to the branch destination instruction while skipping instructions located between the branch instruction and the branch destination instruction. It should be noted that, in this embodiment, the branch instruction is prevented from entering the execution unit 6 and from being processed by the execution unit 6. The branch destination address is transferred to the counters 2 and 7.

In cases where a branch is absent from a series of instructions, the processing system of FIG. 1 operates as follows. An instruction is fetched from the cache 1 in accordance with an address generated by the instruction pre-fetch counter 2 and is stored into the instruction buffer 3. This is called an instruction pre-fetch process. The instruction pre-fetch counter 2 updates the present address and specifically generates a new address by counting up the present address by a value corresponding to the number of bytes of the instruction just transferred to the instruction buffer 3. The instruction pre-fetch counter 2 holds the new address until it is updated. Such processes are periodically reiterated so that instructions are sequentially transferred from the cache 1 to the instruction buffer 3.

The instruction decoder 4 fetches an instruction from a bottom of the instruction buffer 3 and decodes the fetched instruction. The instruction decoder 4 derives an execution command or commands from the fetched instruction and transfers the derived command or commands to the execution command buffer 5. When the command or commands are transferred to the execution command buffer 5, the instruction decoding counter 7 counts up the address by a value corresponding to the number of bytes of the decoded instruction and thereby generates a new address corresponding to an instruction to be decoded subsequently. While the instruction decoder 4 is processing an end word of an instruction, a header address of an instruction to be decoded subsequently is set in the instruction decoding counter 7. Such processes are periodically reiterated so that instructions are sequentially transferred from the instruction buffer 3 to the instruction decoder 4 and are sequentially decoded therein. In addition, execution commands are sequentially transferred from the instruction decoder 4 to the execution command buffer 5. Each time the decoding of one instruction is completed, the instruction decoder 4 allows a header address of a subsequent instruction to be transferred from the instruction decoding counter 7 to the program counter buffer 8.

The execution unit 6 fetches a command or commands from a bottom of the execution command buffer 5 and executes the fetched command or commands. Such processes are periodically reiterated so that commands are sequentially transferred from the execution command buffer 5 to the execution unit 6 and are sequentially executed thereby. An address held in a bottom of the program counter buffer 8 corresponds to an instruction having a command which is currently executed by the execution unit 6. Each time the execution of a command or commands of one instruction is completed, the address in the bottom of the program counter buffer 8 is discarded and is replaced with a new address.

Figure 2:
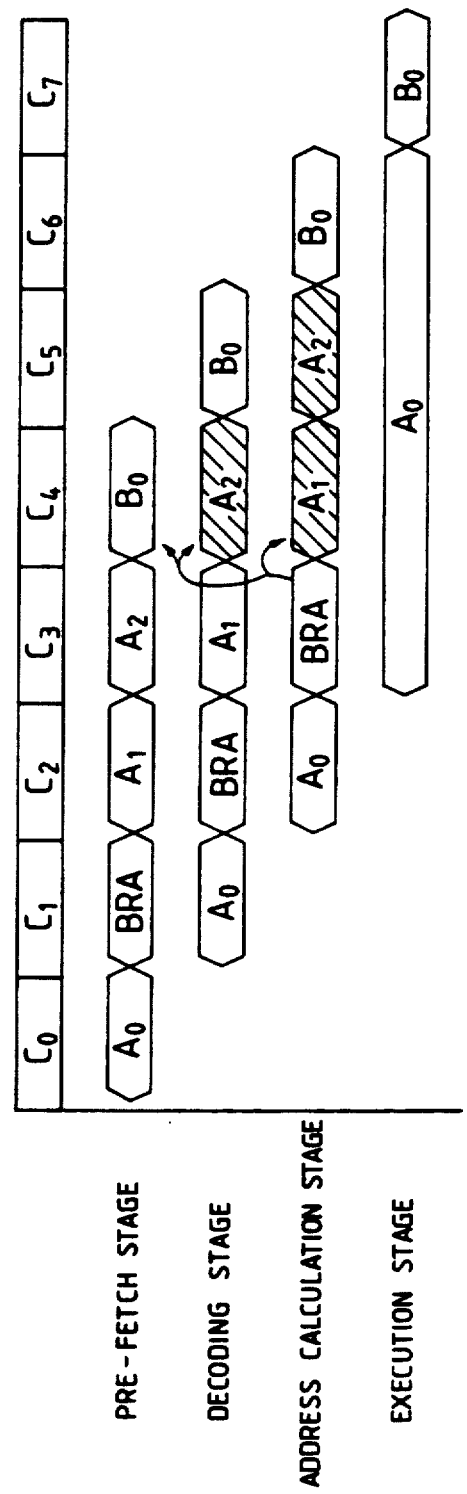
FIG. 2 is a timing diagram of operation of the processing system of FIG. 1.

Operation of the processing system of FIG. 1 on a series of instructions including a branch instruction will be described hereinafter with reference to FIG. 2. During a first cycle C0, a first instruction A0 is fetched from the cache 1 in accordance with an address generated by the instruction pre-fetch counter 2 and is stored into a bottom of the instruction buffer 3. This is called an instruction pre-fetch process. The instruction pre-fetch counter 2 updates the address and specifically generates a new address by counting up the present address by a value corresponding to the number of bytes of the instruction A0. The instruction pre-fetch counter 2 holds the new address until it is updated. It is now assumed that the new address corresponds to an unconditional branch instruction BRA.

During a cycle C1 following the cycle C0, the branch instruction BRA is transferred from the cache 1 to the instruction buffer 3 in the pre-fetch process while the instruction decoder 4 fetches the instruction A0 from the instruction buffer 3. The instruction A0 is decoded by the instruction decoder 4 so that a command or commands are derived from the instruction A0. The command or commands related to the instruction A0 are transferred to the execution command buffer 5. Simultaneously, the instruction decoding counter 7 generates an address corresponding to an instruction to be decoded subsequently and holds the generated address.

During a cycle C2 following the cycle C1, an instruction A1 subsequent to the branch instruction BRA is transferred from the cache 1 to the instruction buffer 3 in the pre-fetch process while the instruction decoder 4 fetches the branch instruction BRA from the instruction buffer 3. The branch instruction BRA is decoded by the instruction decoder 4. The branch instruction BRA generates a command related to address calculation but does not generate any command to the execution unit 6. During the cycle C2, the command or commands related to the instruction A0 are subjected to effective address calculation in which an address or addresses of data to be processed by the instruction A0 are determined. Furthermore, the pre-fetch process is interrupted.

During a cycle C3 following the cycle C2, an instruction A2 subsequent to the instruction A1 is transferred from the cache 1 to the instruction buffer 3 in the pre-fetch process while the instruction decoder 4 fetches the instruction A1 from the instruction buffer 3. The instruction A1 is decoded by the instruction decoder 4. During the cycle C3, the branch instruction BRA is subjected to effective address calculation in which an address of an instruction B0 located at a downstream end or destination of this branch is determined. Specifically, the instruction decoder 4 activates the adder 9. The adder 9 adds the address of the branch instruction BRA and a displacement attached to the branch instruction BRA and thereby generates a new address corresponding to the branch destination instruction B0. The adder 9 receives the branch instruction address and the displacement from the instruction decoding counter 7 and the instruction buffer 3 respectively. The instruction decoder 4 interrupts the normal counting-up operations of the counters 2 and 7, and transfers the address of the branch destination instruction B0 from the adder 9 to the counters 2 and 7. Accordingly, the address of the branch destination instruction B0 is set in the counters 2 and 7. During the cycle C3, the execution unit 6 fetches the command or commands of the instruction A0 from the execution command buffer 5 and executes the fetched command or commands.

During a cycle C4 following the cycle C3, the instruction decoder 4 allows the pre-fetch counter 2 to output the address of the branch destination instruction B0 to the cache 1 so that the branch destination instruction B0 is transferred from the cache 1 to the instruction buffer 3 in the pre-fetch process. The instruction decoder 4 initializes the instruction buffer 3 before the branch destination instruction B0 is stored into the instruction buffer 3. During the cycle C4, the instruction decoder 4 fetches the instruction A2 from the instruction buffer 3 and then decodes the instruction A2. The instruction decoder 4 disables the instruction A2 which is being decoded. In addition, the instruction decoder 4 disables the instruction A1 which was decoded. Specifically, the instruction A1 in the effective address calculation stage is disabled while the command or commands related to the instruction A1 and stored in the execution command buffer 5 are cancelled. The instruction decoder 4 allows the instruction decoding counter 7 to output the header address of the branch destination instruction B0 to the program counter buffer 8. In the program counter buffer 8, the header address of the branch destination instruction B0 is written over the address of the branch instruction BRA.

As understood from the previous description, the branch destination instruction B0 immediately follows the instruction A2 in the pre-fetch process so that an instruction or instructions located between the instructions A2 and B0 are prevented from undergoing the pre-fetch process. In this way, an unnecessary waste of the pre-fetch process is decreased.

During a cycle C5 following the cycle C4, the instruction decoder 4 fetches the branch destination instruction B0 from the instruction buffer 3 and decodes the branch destination instruction B0. The instruction decoder 4 derives a command or commands from the branch destination instruction B0 and transfers the derived command or commands to the execution command buffer 5.

During a cycle C6 following the cycle C5, the command or commands related to the branch destination instruction B0 are subjected to effective address calculation in which an address or addresses of data to be processed by the instruction B0 are determined.

During a cycle C7 following the cycle C6, the execution unit 6 fetches the command or commands of the branch destination instruction B0 from the execution command buffer 5 and then executes the fetched command or commands.

An address held in the bottom of the program counter buffer 8 corresponds to an instruction having a command or commands which are currently executed by the execution unit 6. Each time the execution of the command or commands related to one instruction is completed, the address in the bottom of the program counter buffer 8 is discarded and is replaced with a new address.

As described previously, after the instruction decoder 4 decodes the branch instruction BRA and then performs effecitve address calculation related to the branch instruction BRA, the instruction decoder 4 enables the fetch of the branch destination instruction B0 without waiting the end of the execution of the command or commands of the instruction A0. Accordingly, the branch destination instruction B0 is promptly prepared. After the execution of the command or commands of the instruction A0 is completed, the command or commands of the branch destination instruction B0 start to be executed. The instruction decoder 4 disables the instruction A1 which was decoded and also disables the instruction A2 which is being decoded.

As understood from the previous description, in the case where a branch instruction BRA is present, the branch instruction BRA is completely processed within the instruction decoder 4 and is prevented from reaching the execution unit 6. The instruction decoder 4 enables the calculation of the address of a branch destination instruction B0 in independently parallel with the execution of commands of a preceding instruction by the execution unit 6. In addition, the instruction decoder 4 enables the high-speed preparation of the branch destination instruction B0 in independently parallel with the execution of commands of the preceding instruction by the execution unit 6. Furthermore, the instruction decoder 4 performs the decoding of the branch destination instruction B0 in independently parallel with the execution of commands of the preceding instruction by the execution unit 6. In the case where four or more execution cycles are necessary to complete the execution of the command or commands related to the instruction A0, the branch instruction BRA outwardly corresponds to "0" cycle and thus there is no overhead due to the branch. Accordingly, the branch instruction BRA, the branch destination instruction B0, and the subsequent instructions are processed at high speeds.

Figure 6:
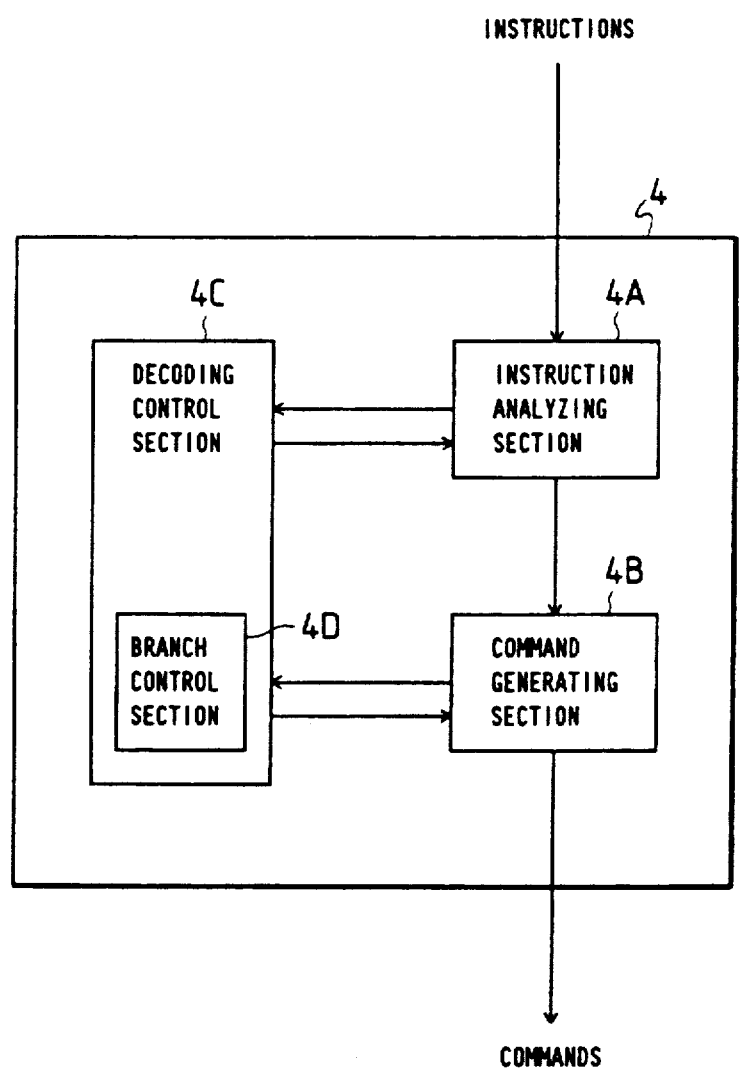
FIG. 6 is a block diagram of the instruction decoder of FIG. 1.

This embodiment will be further described with reference to FIGS. 6 and 7. As shown in FIG. 6, the instruction decoder 4 includes a combination of an instruction analyzing section 4A, a command generating section 4B, and a decoding control section 4C. The instruction analyzing section 4A is preferably composed of a programmable logic array, and analyzes instructions inputted into the instruction decoder 4. The command generating section 4B is preferably composed of a read-only memory (ROM). The decoding control section 4C outputs control signals to the command generating section 4B in accordance with results of analyzation of instructions which are supplied from the instruction analyzing section 4A. In the case of an instruction other than a branch instruction, the command generating section 4B derives a command or commands from a signal outputted by the instruction analyzing section 4A which corresponds to the instruction. In this case, the derived command or commands are outputted to the execution command buffer 5. In the case of a branch instruction, the command generating section 4B produces various commands in response to the control signals from the decoding control section 4C. In this case, the commands are outputted to the elements executing the instruction pre-fetch process, and the elements executing the effective address calculation.

The decoding control section 4C is preferably composed of a combination of discrete logic components. The decoding control section 4C may be composed of a sequencer, a controller, or a simple processor. The decoding control section 4C includes a sub section 4D for the control of the branch processing. FIG. 7 shows a cotrol sequence executed by the branch processing control section 4D.

As shown in FIG. 7, a first block 61 of the control sequence determines whether or not a currently-inputted instruction is a branch instruction BRA. When the currently-inputted instruction is not the branch instruction BRA, the control sequence advances to steps of normal processing. When the currently-inputted instruction is the branch instruction BRA, the control sequence advances to a block 62.

The block 62 allows commands to be outputted to the elements executing the instruction pre-fetch process. These commands are designed so as to interrupt the instruction pre-fetch process. Then, the block 62 allows commands to be outputted to the elements executing the effective address calculation. These commands are designed so as to calculate an address of a branch destination instruction B0.

A block 63 following the block 62 allows a command to be outputted to an effective address calculator (not shown). This command is designed so as to perform effective address calculation in which an address or addresses of data to be processed by an instruction A1 are determined. In addition, the block 63 enables the address of the branch destination address B0 to be stored into the instruction pre-fetch counter 2 and the instruction decoding counter 7.

A block 64 following the block 63 enables the instruction pre-fetch process to be started. The block 64 initializes the instruction buffer 3 and then stores the branch destination instruction B0 into the instruction buffer 3. The block 64 disables a state of the effective address calculation on the instruction A1. In addition, the block 64 disables a subsequent instruction A2 which is being decoded. The block 64 enables the address of the branch destination address B0 to be written over the address of the branch instruction BRA in the program counter buffer 8.

A block 65 following the block 64 enables the effective address calculation process for the branch destination instruction B0. In addition, the block 64 disables a state of the effective address calculation on the instruction A2. After the block 65, the control sequence advances to steps of normal processing.

DESCRIPTION OF THE SECOND PREFERRED EMBODIMENT

Figure 3:
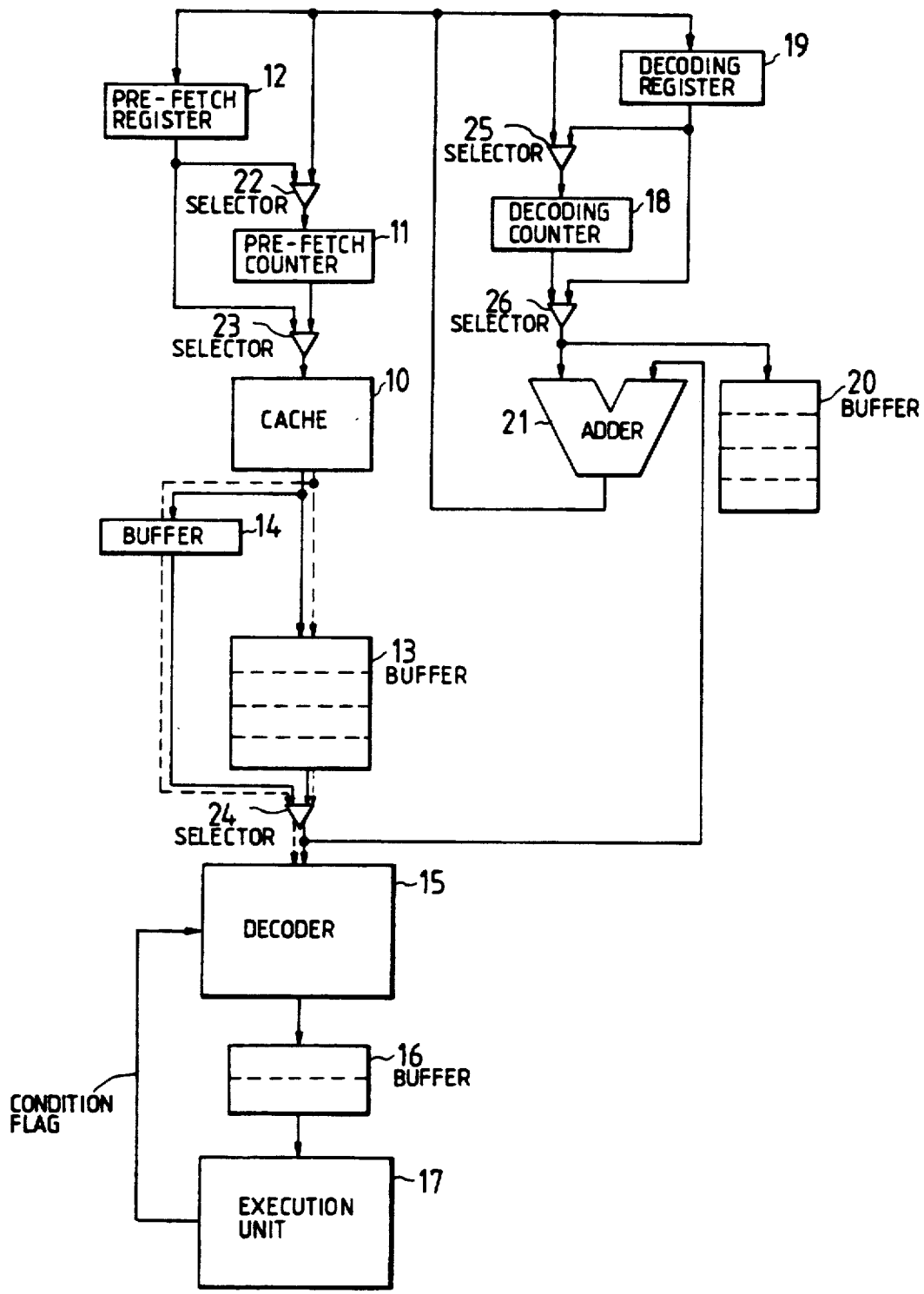
FIG. 3 is a block diagram of a processing system for a branch instruction according to a second embodiment of this invention.

With reference to FIG. 3, a processing system for a branch instruction includes a cache 10 holding instructions which can be read out at a high speed. In FIG. 3, a conditional branch instruction and a corresponding branch destination instruction flow along arrows composed of broken lines. An instruction pre-fetch counter 11 outputs an address which is used in precedently fetching a corresponding instruction from the cache 10. In order to update the address outputted from the pre-fetch counter 11, the pre-fetch counter 11 counts up the address by a value corresponding to the number of bytes of the related instruction. An address register 12 temporarily holds an address of a branch destination instruction which is calculated after a corresponding branch instruction is decoded. Instructions other than a branch destination instruction are sequentially transferred from the cache 10 to a FIFO (First-In First-Out) type instruction buffer 13. The instruction buffer 13 has four stages. It should be noted that the instruction buffer 13 may have only one stage or the number of stages of the instruction buffer 13 may differ from four. The instruction buffer 13 sequentially receives instructions from the cache 10 and cues the instructions. A branch instruction buffer 14 temporarily holds a branch destination instruction which is read out from the cache 10. An instruction decoder 15 sequentially receives instructions from the instruction buffer 13 and the branch instruction buffer 14 via selector 24 and then decodes the instructions, thereby deriving commands from the decoded instructions. As will be made clear hereinafter, the instruction decoder 15 has several control functions. It should be noted that lines of transmission of control signals from the instruction decoder 15 to other elements are omitted from FIG. 3. A FIFO type execution command buffer 16 cues commands outputted from the instruction decoder 15. The execution command buffer 16 has two stages. It should be noted that the execution command buffer 16 may have only one stage or the number of stages of the execution command buffer 16 may differ from two. An execution unit 17 sequentially receives commands from the execution command buffer 16 and executes the commands. An instruction decoding counter 18 generates an address corresponding to an instruction to be subsequently proecessed in the instruction decoder 15. The address generated by the instruction decoding counter 18 is periodically updated. During the address updating process, the instruction decoding counter 18 counts up the address by a value corresponding to the number of bytes of the related instruction. An address register 19 temporarily holds an address of a branch destination address which is calculated after the corresponding branch instruction is decoded. A FIFO type program counter buffer 20 cues addresses which are sequentially transferred from the instruction decoding counter 18 and the address register 19 via a selector 26. The program counter buffer 20 has four stages. It should be noted that the program counter buffer 20 may have only one stage or the number of stages of the program counter buffer 20 may differ from four. In general, addresses stored in the program counter buffer 20 correspond to instructions which are being subjected to a decoding process, a process or information in a first stage of the execution command buffer 16, a process or information in a second stage of the execution command buffer 16, and an execution process respectively. An adder 21 is controlled by the instruction decoder 15 in response to a branch instruction. Specifically, the adder 21 adds an address outputted from the instruction decoding counter 18 and a displacement supplied from the instruction buffer 13, and thereby generates a new address corresponding to a branch destination instruction. The branch destination address is transferred to the address registers 12 and 19, and is also transferred to the counters 11 and 18 via selectors 22 and 25. The selector 22 serves to select an input to the pre-fetch counter 11. A selector 23 serves to select an input to the cache 10. The selector 24 serves to select an input to the instruction decoder 15. The selector 25 serves to select a.. input to the instruction decoding counter 18. The selector 26 serves to select an input to the adder 21.

In cases where a branch is absent from a series of instructions, the processing system of FIG. 3 operates as follows. An instruction is fetched from the cache 10 in accordance with an address generated by the instruction pre-fetch counter 11 and is stored into the instruction buffer 13. This is called an instruction pre-fetch process. The instruction pre-fetch counter 11 updates the present address and specifically generates a new address by counting up the present address by a value corresponding to the number of bytes of the instruction just transferred to the instruction buffer 13. The instruction pre-fetch counter 11 holds the new address until it is updated. Such processes are periodically reiterated so that instructions are sequentially transferred from the cache 10 to the instruction buffer 13.

The instruction decoder 15 fetches an instruction from a bottom of the instruction buffer 13 via the selector 24 and decodes the fetched instruction. The instruction decoder 15 derives an execution command or commands from the fetched instruction and transfers the derived command or commands to the execution command buffer 16. When the command or commands are transferred to the execution command buffer 16, the instruction decoding counter 18 counts up the address by a value corresponding to the number of bytes of the decoded instruction and thereby generates a new address corresponding to an instruction to be decoded subsequently. While the instruction decoder 15 is processing an end word of an instruction, a header address of an instruction to be decoded subsequently is set in the instruction decoding counter 18. Such processes are periodically reiterated so that instructions are sequentially transferred from the instruction buffer 13 to the instruction decoder 15 and are sequentially decoded therein. In addition, execution commands are sequentially transferred from the instruction decoder 15 to the execution command buffer 16. Each time the decoding of one instruction is completed, the instruction decoder 15 allows a header address of a subsequent instruction to be transferred from the instruction decoding counter 18 to the program counter buffer 20 via the selector 26.

The execution unit 17 fetches a command from a bottom of the execution command buffer 16 and executes the fetched command. Such processes are periodically reiterated so that commands are sequentially transferred from the execution command buffer 16 to the execution unit 17 and are sequentially executed thereby. An address held in a bottom of the program counter buffer 20 corresponds to an instruction having a command which is currently executed by the execution unit 17. Each time the execution of a command or commands of one instruction is completed, the address in the bottom of the program counter buffer 20 is discarded and is replaced with a new address.

Figure 4:
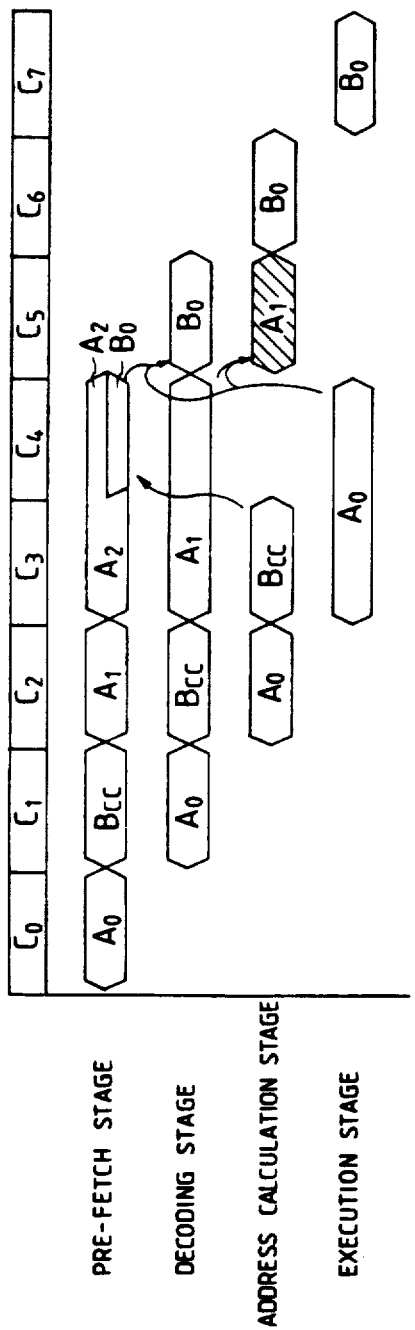
FIG. 4 is a timing diagram of operation of the processing system of FIG. 3 in the case where a branch is taken.

The operation of the processing system of FIG. 3 will be further described with reference to FIG. 4. In cases where a conditional branch instruction is taken, the processing system of FIG. 3 operates as follows. During a first cycle C0, a first instruction A0 is fetched from the cache 10 in accordance with an address generated by the instruction pre-fetch counter 11 and is stored into a bottom of the instruction buffer 13. This is called an instruction pre-fetch process. The instruction pre-fetch counter 11 updates the address and specifically generates a new address by counting up the present address by a value corresponding to the number of bytes of the instruction A0. The instruction pre-fetch counter 11 holds the new address until it is updated. It is now assumed that the new address corresponds to a conditional branch instruction Bcc.

During a cycle C1 following the cycle C0, the branch instruction Bcc is transferred from the cache 10 to the instruction buffer 13 in the pre-fetch process while the instruction decoder 15 fetches the instruction A0 from the instruction buffer 13. The instruction A0 is decoded by the instruction decoder 15 so that a command or commands are derived from the instruction A0. The command or commands related to the instruction A0 are transferred to the exectution command buffer 16. Simultaneously, the instruction decoding counter 18 generates an address corresponding to an instruction to be decoded subsequently and holds the generated address.

During a cycle C2 following the cycle C1, an instruction A1 subsequent to the branch instruction Bcc is transferred from the cache 10 to the instruction buffer 13 in the pre-fetch process while the instruction decoder 15 fetches the branch instruction Bcc from the instruction buffer 13. The branch instruction Bcc is decoded by the instruction decoder 15. During the cycle C2, the command or commands related to the instruction A0 are subjected to effective address calculation in which an address or addresses of data to be processed by the instruction A0 are determined. Furthermore, the pre-fetch process is interrupted.

During a cycle C3 following the cycle C2, an instruction A2 subsequent to the instruction A1 is transferred from the cache 10 to the instruction buffer 13 in the pre-fetch process while the instruction decoder 15 fetches the instruction A1 from the instruction buffer 13. The instruction A1 is decoded by the instruction decoder 15. During the cycle C3, the branch instruction Bcc is subjected to effective address calculation in which an address of an instruction B0 located at a downstream end or destination of this branch is determined. Specifically, the instruction decoder 15 allows a displacement to be transferred from the instruction buffer 13 to the adder 21 via the selector 24. The displacement is attached to the branch instruction Bcc. In addition, the instruction decoder 15 allows the address of the branch instruction Bcc to be transferred from the instruction decoding counter 18 to the adder 21 via the selector 26. Furthermore, the instruction decoder 15 activates the adder 21. The adder 21 adds the address of the branch instruction Bcc and the displacement and thereby generates a new address corresponding to the branch destination instruction B0. The address of the branch destination instruction B0 which is outputted from the adder 21 is stored into the address registers 12 and 19. The selectors 22 and 25 are controlled to prevent the address of the branch destination instruction B0 from being written into the counters 11 and 18. The instruction decoder 15 interrupts the instruction pre-fetch operation so that the instruction A2 remains in the bottom of the instruction buffer 13. During the cycle C3, the execution unit 17 fetches the command or commands of the instruction A0 from the execution command buffer 16 and executes the fetched command or commands.

During a cycle C4 following the cycle C3, the instruction decoder 15 allows the address of the branch destination instruction B0 to be outputted from the address register 12 to the cache 10 via the selector 23. As a result, the branch destination instruction B0 is fetched from the cache 10 and is stored into the branch instruction buffer 14. The branch destination instruction B0 is not stored into the instruction buffer 13. At a final stage of the cycle C4, the instruction pre-fetch counter 11 holds an address of an instruction which is to be fetched subsequently to the instruction stored in the instruction buffer 13. In addition, the address register 12 holds the address of the branch destination instruction B0. The instruction decoding counter 18 holds the address of the instruction A1 which follows the branch instruction Bcc. The address register 19 holds the address of the branch destination instruction B0. The bottom of the instruction buffer 13 holds the instruction A2 which follows the instruction A1. The branch instruction buffer 14 holds the branch destination instruction B0. In this way, the instructions A2 and B0 are prepared in the buffers 13 and 14 respectively. The instruction A2 is to be executed when the branch instruction Bcc is not taken. The instruction B0 is to be executed when the branch instruction Bcc is taken. After the instructions A2 and B0 are prepared, the decoder 15 waits the determination of a condition flag of the instruction A0 in the execution unit 17 and interrupts the operations of the elements except the execution unit 17.

During a cycle C5 following the cycle C4, after the condition flag of the instruction A0 is determined in the execution unit 17, the instruction decoder 15 judges whether or not a condition of the branch instruction Bcc is satisfied to take the branch instruction Bcc. In the case where the branch instruction Bcc is taken, the instruction decoder 15 changes the selector 24 so that the instruction decoder 15 fetches the branch destination instruction B0 from the branch instruction buffer 14 via the selector 24. The instruction decoder 15 initializes the instruction buffer 13. The instruction decoder 15 changes the selector 22 so that the header address of the branch destination instruction B0 is transferred from the address register 12 to the instruction pre-fetch counter 11 via the selector 22. The instruction decoder 15 changes the selector 25 so that the header address of the branch destination instruction B0 is transferred from the address register 19 to the instruction decoding counter 18 via the selector 25. The instruction decoder 15 changes the selector 26 so that the header address of the branch destination instruction B0 is transferred from the instruction decoding counter 18 to the program counter buffer 20 via the selector 26. In the program counter buffer 20, the header address of the branch destination instruction B0 is written over the address of the branch instruction Bcc. The instruction decoder 15 enables the instruction pre-fetch process to be started. The instruction decoder 15 decodes the branch destination instruction B0 and thus derives a command or commands from the branch destination instruction B0. The derived command or commands are transferred to the execution command buffer 16. The instruction decoder 15 disables the instruction A1 which was decoded.

As understood from the previous description, the branch destination instruction B0 immediately follows the instruction A2 in the pre-fetch process so that an instruction or instructions located between the instructions A2 and B0 are prevented from undergoing the pre-fetch process. In this way, an unnecessary waste of the pre-fetch process is decreased.

During a cycle C6 following the cycle C5, the command or commands related to the branch destination instruction B0 are subjected to effective address calculation in which an address or addresses of data to be processed by the instruction B0 are determined.

During a cycle C7 following the cycle C6, the execution unit 17 fetches the command or commands of the branch destination instruction B0 from the execution command buffer 16 and then executes the fetched command or commands.

An address held in the bottom of the program counter buffer 20 corresponds to an instruction having a command or commands which are currently executed by the execution unit 17. Each time the execution of the command or commands related to one instruction is completed, the address in the bottom of the program counter buffer 20 is discarded and is replaced with a new address.

As described previously, after the instruction decoder 15 decodes the branch instruction Bcc and then performs effecitve address calculation related to the branch instruction Bcc, the instruction decoder 4 enables the fetch of the branch destination instruction B0 and waits the end of the execution of the command or commands of the instruction A0. When the execution of the command or commands of the instruction A0 is completed and the related flag is determined, the branch instruction Bcc is taken and the branch destination instruction B0 is promptly transferred to the instruction decoder 15. The instruction decoder 15 disables the instruction A1 which is located between the branch instruction Bcc and the branch destination instruction B0.

Figure 5:
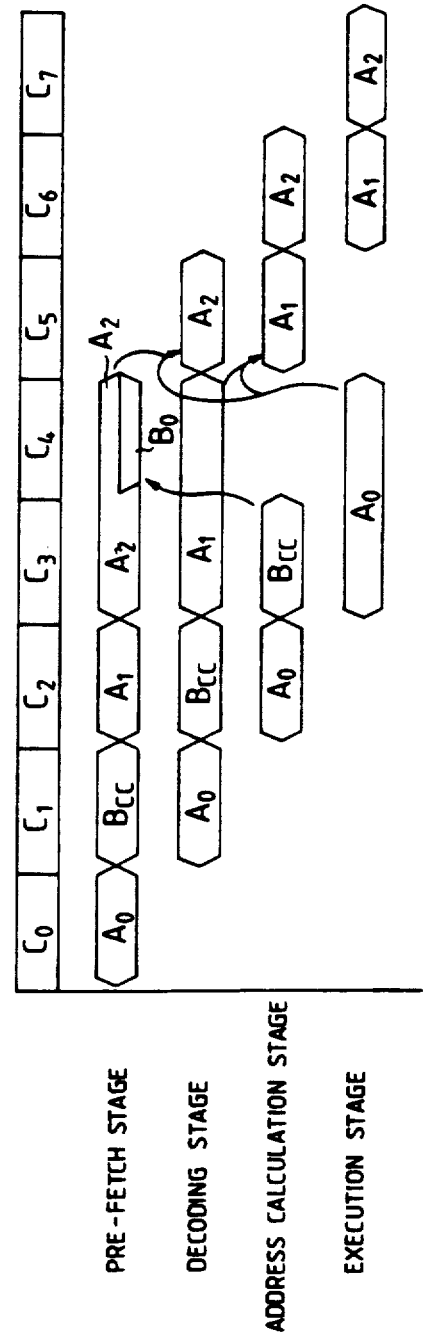
FIG. 5 is a timing diagram of operation of the processing system of FIG. 3 in the case where a branch is not taken.

The operation of the processing system of FIG. 3 will be further described with reference to FIG. 5. In cases where a conditional branch instruction is not taken, the processing system of FIG. 3 operates as follows. During a period from a first cycle C0 to a fifth cycle C4, the operation of the processing system is similar to that in the case where the conditional branch instruction is taken.

During a cycle C5 following the cycle C4, the instruction decoder 15 changes the selector 24 so that the instruction decoder 15 fetches the instruction A2 from the instruction buffer 13 via the selector 24. The instruction A2 follows the instruction A1. The instruction decoder 15 changes or holds the selectors 22, 23, 24, 25, and 26 to or in states which occur during the absense of a branch instruction. The header address of the instruction A2 is transferred from the instruction decoding counter 18 to the program counter buffer 20. In the program counter buffer 20, the header address of the instruction A2 is written over the branch instruction Bcc. The instruction decoder 15 decodes the instruction A2 and thus derives a command or commands from the instruction A2. The derived command or commands are transferred to the execution command buffer 16. The command or commands of the preceding instruction A1 are subjected to effective address calculation in which an address or addresses of data to be processed by the instruction A1 are determined.

During a cycle C6 following the cycle C5, the command or commands related to the instruction A2 are subjected to effective address calculation in which an address or addresses of data to be processed by the instruction B0 are determined. The execution unit 17 fetches the command or commands of the instruction A1 from the execution command buffer 16 and then executes the fetched command or commands.

During a cycle C7 following the cycle C6, the execution unit 17 fetches the command or commands of the instruction A2 from the execution command buffer 16 and then executes the fetched command or commands.

An address held in the bottom of the program counter buffer 20 corresponds to an instruction having a command or commands which are currently executed by the execution unit 17. Each time the execution of the command or commands related to one instruction is completed, the address in the bottom of the program counter buffer 20 is discarded and is replaced with a new address.

As described previously, after the instruction decoder 15 decodes the branch instruction Bcc and then performs effecitve address calculation related to the branch instruction Bcc, the instruction decoder 4 enables the fetch of the branch destination instruction B0 and waits the end of the execution of the command or commands of the instruction A0. When the execution of the command or commands of the instruction A0 is completed and the related flag is determined, the branch instruction Bcc is not taken and the instruction A2 which was prepared is promptly transferred to the instruction decoder 15. The preceding instruction A1 is transmitted to a subsequent stage.

As understood from the previous description, in the case where a conditional branch instruction Bcc is present, the branch instruction Bcc is completely processed within the instruction decoder 15 and is prevented from reaching the execution unit 17. The instruction decoder 15 enables the calculation of the address of a branch destination instruction B0 in independently parallel with the execution of commands of a preceding instruction by the execution unit 17. In addition, the instruction decoder 15 enables the high-speed preparation of each of the branch destination instruction B0 and the non-branch instruction in independently parallel with the execution of commands of the preceding instruction by the execution unit 17. The instruction decoder 15 holds the decoding process and the command generation suspended until a branch condition is determined. Furthermore, the judgment of the branch condition is performed within the instruction decoder 15. Accordingly, the branch instruction Bcc, the branch destination instruction B0, and the subsequent instructions are processed at high speeds.

Figure 8B:
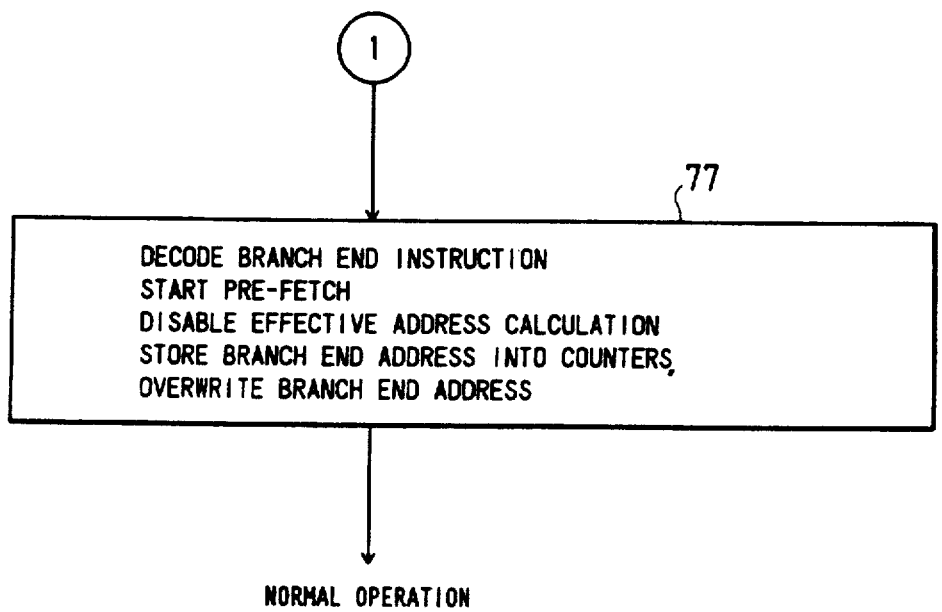
Figure 8C:
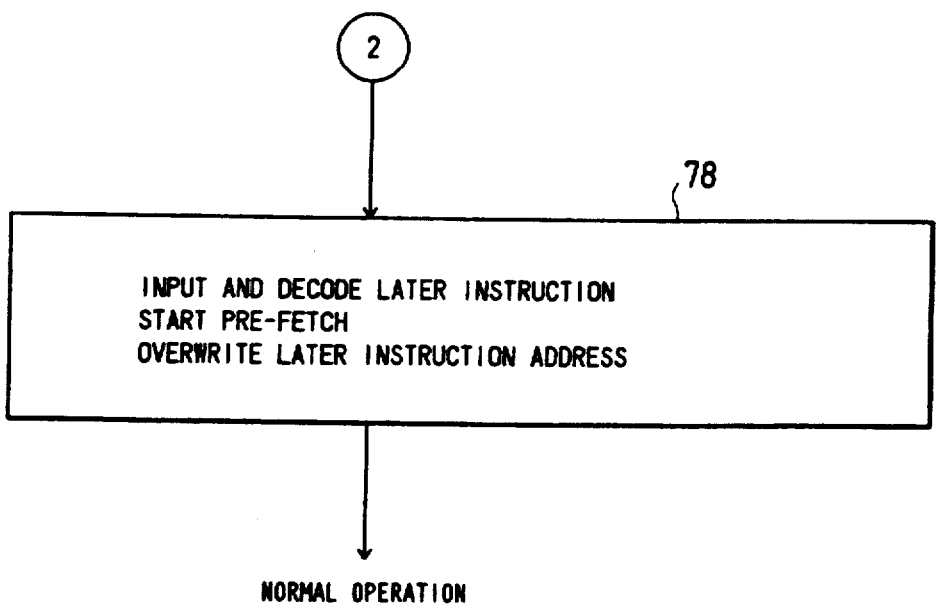

This embodiment will be further described with referene to FIG. 8. The instruction decoder 15 is similar to the instruction decoder 4 of FIGS. 1 and 6 except for design changes indicated hereinafter.

As shown in FIG. 8, a first block 71 of the control sequence determines whether or not a currently-inputted instruction is a conditional branch instruction Bcc. When the currently-inputted instruction is not the branch instruction Bcc, the control sequence advances to steps of normal processing. When the currently-inputted instruction is the branch instruction Bcc, the control sequence advances to a block 72.

The block 72 allows commands to be outputted to the elements executing the instruction pre-fetch process. These commands are designed so as to interrupt the instruction pre-fetch process. Then, the block 72 allows commands to be outputted to the elements executing the effective address calculation. These commands are designed so as to calculate an address of a branch destination instruction B0.

A block 73 following the block 72 allows a command to be outputted to an effective address calculator (not shown). This command is designed so as to perform effective address calculation in which an address or addresses of data to be processed by an instruction A1 are determined. In addition, the block 73 enables the address of the branch destination address B0 to be stored into the registers 12 and 19. The block 73 controls the instruction decoding counter 18 so that the instruction decoding counter 18 performs the count-up process and that the instruction decoding counter 18 generates an address corresponding to the instruction A1.

A block 74 following the block 73 enables the branch destination instruction B0 to be stored into the instruction buffer 13. The block 74 suspends operations other than operation of the execution unit 17 and maintains a current state. After the block 74, the control sequence advances to a block 75.

The block 75 judges whether or not a condition flag of the execution unit 17 is determined. When the condition flag is not determined, the block 75 is repeated. When the condition flag is determined, the control sequence advances to a block 76.

The block 76 determines whether or not the branch is taken. When the branch is taken, the control sequence advances to a block 77. When the branch is not taken, the control sequence advances to a block 78.

The block 77 allows the branch destination instruction B0 to be fetched from the branch instruction buffer 14 and enables the branch destination instruction B0 to be decoded. The block 77 enables the instruction pre-fetch process to be started. In addition, the block 77 disables a state of the effective address calculation. The block 77 allows the address of the branch destination instruction B0 to be stored into the instruction pre-fetch counter 11 and the instruction decoding counter 18. The block 77 enables the address of the branch destination instruction B0 to be written over the address of the branch instruction Bcc in the program counter buffer 20. After the block 77, the control sequence advances to steps of normal processing.

The block 78 allows an instruction A2 to be fetched from the instruction buffer 13 and enables the branch destination instruction A2 to be decoded. The block 78 enables the instruction pre-fetch process to be started. In addition, the block 77 enables the address of the branch destination instruction B0 to be written over the address of the branch instruction Bcc in the program counter buffer 20. After the block 77, the control sequence advances to steps of normal processing.

What is claimed is:

1. A processing system for executing a stored program of instructions including dedicated decoding and execution means for processing branch instructions, comprising:

a memory for storing instructions including a branch instruction and a branch destination instruction and responsive to first and second address signals for supplying said instructions;

an instruction pre-fetch address register storing a periodically-updated first address and supplying said first address to said memory for reading the instructions from the memory;

a branch instruction pre-fetch address register storing a second address and supplying said second address to said memory and to said instruction pre-fetch address register for reading the branch destination instruction from the memory;

a first execution unit including an instruction decoder for providing execution control signals in response to decoding said instruction;

an instruction buffer receiving said instructions from said memory and sequentially storing the instructions from the memory by use of the periodically-updated address in the instruction pre-fetch address register, the instruction buffer supplying the sequentially stored instructions to the first execution unit, the first execution unit decoding the instructions supplied by the instructions buffer to supply decoded instruction commands;

a branch instruction buffer receiving one of said instructions from said memory and storing the instruction which is read from the memory by use of the branch destination address in the branch instruction pre-fetch address register, the branch instruction buffer supplying the branch destination instruction to the first execution unit, the first execution unit decoding the instruction supplied by the branch instruction buffer to supply said control signals;

a calculator for calculating the branch destination address;

said decoder including an instruction control circuit for decoding instructions supplied by said instruction buffer and, detecting a branch instruction and, in response, selectively supplying commands for transferring said instruction to a second execution unit and supplying a control signal to said second execution unit for calculating said branch destination address; and said second execution unit for executing the commands generated by the instruction control circuit;

wherein the instruction control circuit is operative to detect a conditional branch instruction;
wherein when the instruction control circuit detects the conditional branch instruction, the instruction control circuit
  (i) prevents a command of the conditional branch instruction from being transferred to the second execution unit,
  (ii) enables the calculation of the branch destination address by the calculator,
  (iii) stores a result of the calculation into the branch instruction pre-fetch address register,
  (iv) reads the branch destination instruction corresponding to the branch destination address from the memory,
  (v) stores the branch destination instruction into the branch destination buffer,
  (vi) interrupts decoding until execution of the instructions decoded prior to the conditional branch instruction is completed,
  (vii) waits for a determination of a result of calculation,
  (viii) determines whether establishment of a branch is present or absent after the result is determined, and
  (ix) selectively (a) disables (I) the decoded instructions which follow the conditional branch instruction and (II) generation of a command after decoding of the branch destination instruction stored in the branch destination instruction buffer and (III) transfer of the command to the execution unit in cases where the branch is established, or (b) causes execution of the commands of the decoded instructions which follow the branch instruction by the second execution unit in cases where the branch is not established.

2. A processing system for a branch instruction, comprising:
  a memory for storing instructions including a branch instruction and a branch destination instruction;
  an instruction pre-fetch address register storing a periodically-updated first address and supplying said first address to said memory for reading the instructions from the memory;
  an instruction decoder;
  an instruction buffer receiving said instructions form said memory and sequentially storing the instructions read from the memory by use of the periodically-updated address in the instruction pre-fetch address register, the instruction buffer supplying the instructions to the instruction decoder in response to a request from the instruction decoder;
  the instruction decoder decoding the instructions outputted by the instruction buffer and, in response, supplying commands, the instruction decoder being operative to detect the branch instruction;
  a calculator calculating a branch destination address;
  an execution unit executing the commands generated by the instruction decoder; and
  said instruction control circuit responsive to the instruction decoder detecting the branch instruction for
    (i) preventing a command of the branch instruction from being transferred to the execution unit and enabling the calculation of the branch destination address by the calculator,
    (ii) storing a result of the calculation into the instruction pre-fetch address register,
    (iii) reading the branch destination instruction corresponding to the branch destination address from the memory,
    (iv) decoding of the branch destination instruction, and
    (v) generating of a command independently and parallel with the execution of the instructions which are decoded prior to the branch instruction;
wherein in cases where the execution unit is not operating in an executing state, the instruction control circuit immediately transfers the commands to the execution unit.

3. A processing system for a branch instruction, comprising:
  a memory storing instructions including a branch instruction and a branch destination instruction;
  an instruction pre-fetch address register storing a periodically-updated first address and supplying said first address to said memory for reading the instructions from the memory;
  a branch instruction pre-fetch address register storing a second address and supplying said second address to said memory for reading the branch destination instruction from the memory;
  an instruction decoder;
  an instruction buffer receiving said instructions form said memory and sequentially storing the instructions which are read from the memory by use of the periodically-updated address in the instruction pre-fetch address register, the instruction buffer supplying the instructions to the instruction decoder in response to requirements from the instruction decoder;
  the instruction decoder generating commands after decoding the instructions outputted by the instruction buffer, the instruction decoder being operative to detect a conditional branch instruction;
  a branch instruction buffer storing the instruction which is read from the memory by use of the branch destination address in the branch instruction pre-fetch address register, the branch instruction buffer supplying the instruction to the instruction decoder, the instruction decoder decoding the instruction outputted by the branch instruction buffer to supply commands;
  a calculator calculating the branch destination address;
  an execution unit receiving and executing the commands generated by the instruction decoder; and
  an instruction control circuit for, responsive to the instruction decoder detecting the conditional branch instruction for
    (i) preventing a command of the conditional branch instruction from being transferred to the execution unit and enabling the calculation of the branch destination address by the calculator,
    (ii) storing a result of the calculation into the branch instruction pre-fetch address register,
    (iii) reading the branch destination instruction corresponding to the branch destination address from the memory,
    (iv) storing the branch destination instruction into the branch destination buffer, (v) interrupting decoding until execution of the instructions decoded prior to the conditional branch instruction is completed, and (vi) waiting for a determination of a result of calculation independently and parallel with the execution of the instructions which are decoded prior to the branch instruction.

4. A processing system for a branch instruction, comprising:

a memory storing instructions including a branch instruction and a branch destination instruction;

an instruction pre-fetch address register storing a periodically-updated first address and supplying said fist address to said memory for reading the instructions from the memory;

a branch instruction pre-fetch address register storing a second address and supplying said second address to said memory for reading the branch destination instruction from the memory;

an instruction decoder;

an instruction buffer receiving said instructions from said memory and sequentially storing the instructions which are read from the memory by use of the periodically-updated address in the instruction pre-fetch address register, the instruction buffer supplying the instructions to the instruction decoder in response to a request from the instruction decoder;

the instruction decoder generating commands after decoding the instructions outputted by the instruction buffer, the instruction decoder being operative to detect a conditional branch instruction;

a branch instruction buffer receiving said instructions from said memory and storing the instruction which is read from the memory by use of the branch destination address in the branch instruction pre-fetch address register, the branch instruction buffer outputting the instruction to the instruction decoder, the instruction decoder decoding the instruction outputted by the branch instruction buffer;

a calculator calculating the branch destination address;

an execution unit executing the commands generated by the instruction decoder; and an instruction control circuit for, in response to the instruction decoder detecting the conditional branch instruction, (i) preventing a command of the conditional branch instruction from being transferred to the execution unit and enabling the calculation of the branch destination address by the calculator, (ii) storing a result of the calculation into the branch instruction pre-fetch address register, (iii) reading the branch destination instruction corresponding to the branch destination address from the memory, (iv) storing the branch destination instruction into the branch destination buffer, (v) interrupting decoding by said instruction decoder until execution of the instructions decoded prior to the conditional branch instruction is completed, (vi) waiting a determination of a result of calculation, (vii) determining whether establishment of a branch is present or absent after the result is determined, (viii) disabling the decoded instructions which follow the conditional branch instruction and generation of a command after decoding of the branch destination instruction stored in the branch destination instruction buffer and (ix) transferring the command to the execution unit in cases where the branch is established, (x) executing the commands of the decoded instructions which follow the branch instruction by the execution unit in cases where the branch is not established.

* * * * *